United States Patent
El-Yaniv et al.

(10) Patent No.: US 11,429,854 B2
(45) Date of Patent: Aug. 30, 2022

(54) METHOD AND DEVICE FOR A COMPUTERIZED MECHANICAL DEVICE

(71) Applicant: Technion Research & Development Foundation Limited, Haifa (IL)

(72) Inventors: Ran El-Yaniv, Haifa (IL); Bar Hilleli, Holon (IL)

(73) Assignee: Technion Research & Development Foundation Limited, Haifa (IL)

( * ) Notice: Subject to any disclaimer, the term of this patent is extended or adjusted under 35 U.S.C. 154(b) by 1098 days.

(21) Appl. No.: 15/830,067

(22) Filed: Dec. 4, 2017

(65) Prior Publication Data

US 2018/0157973 A1 Jun. 7, 2018

Related U.S. Application Data

(60) Provisional application No. 62/429,814, filed on Dec. 4, 2016.

(51) Int. Cl.
*G06N 3/08* (2006.01)
*G06N 3/04* (2006.01)
(Continued)

(52) U.S. Cl.
CPC ............... *G06N 3/08* (2013.01); *B25J 9/161* (2013.01); *G06N 3/008* (2013.01); *G06N 3/04* (2013.01);
(Continued)

(58) Field of Classification Search
CPC ............ G06N 3/08; G06N 3/008; G06N 3/04; G06N 3/0454; B25J 9/161; G05B 2219/40494
(Continued)

(56) References Cited

U.S. PATENT DOCUMENTS

| | | | |
|---|---|---|---|
| 8,775,341 B1* | 7/2014 | Commons | G10L 15/16 706/20 |
| 2009/0177602 A1* | 7/2009 | Ning | B60K 28/02 706/21 |

(Continued)

OTHER PUBLICATIONS

Argall, Brenna D., et al. "A survey of robot learning from demonstration." Robotics and autonomous systems 57.5 (2009): 469-483. (Year: 2009).*

(Continued)

*Primary Examiner* — Michael J Huntley
*Assistant Examiner* — Sehwan Kim

(57) ABSTRACT

A method for training a computerized mechanical device, comprising: receiving data documenting actions of an actuator performing a task in a plurality of iterations; calculating using the data a neural network dataset and used for performing the task; gathering in a plurality of reward iterations a plurality of scores given by an instructor to a plurality of states, each comprising at least one sensor value, while a robotic actuator performs the task according to the neural network; calculating using the plurality of scores a reward dataset used for computing a reward function; updating at least some of the neural network's plurality of parameters by receiving in each of a plurality of policy iterations a reward value computed by applying the reward function to another state comprising at least one sensor value, while the robotic actuator performs the task according to the neural network; and outputting the updated neural network.

17 Claims, 6 Drawing Sheets

(51) Int. Cl.
G06N 3/00 (2006.01)
B25J 9/16 (2006.01)
(52) U.S. Cl.
CPC . G06N 3/0454 (2013.01); *G05B 2219/40494* (2013.01)
(58) Field of Classification Search
USPC .......................................................... 706/23
See application file for complete search history.

(56) References Cited

U.S. PATENT DOCUMENTS

| | | | | |
|---|---|---|---|---|
| 2013/0190964 | A1* | 7/2013 | Uehara | G01C 21/3691 701/25 |
| 2014/0371907 | A1* | 12/2014 | Passot | G06N 3/008 700/257 |
| 2015/0100530 | A1* | 4/2015 | Mnih | G06N 3/0454 706/25 |

OTHER PUBLICATIONS

Daniel, Christian, et al. "Active Reward Learning." Robotics: Science and systems. vol. 98. 2014. (Year: 2014).*

Su, Pei-Hao, et al. "On-line active reward learning for policy optimisation in spoken dialogue systems." arXiv preprint arXiv:1605.07669 (2016). (Year: 2016).*

Tran, Loc D., et al. "Reinforcement Learning with Autonomous Small Unmanned Aerial Vehicles in Cluttered Environments-" After all these years among humans, you still haven't learned to smile."." 15th AIAA aviation technology, integration, and operations conference. 2015. (Year: 2015).*

Lunghi, Paolo, Marco Ciarambino, and Michèle Lavagna. "A multilayer perceptron hazard detector for vision-based autonomous planetary landing." Advances in Space Research 58.1 (2016): 131-144. (Year: 2016).*

Quek, Boon-Kiat, Javier Ibanez-Guzman, and Khiang-Wee Lim. "A survivability framework for the development of autonomous unmanned systems." 2006 9th International Conference on Control, Automation, Robotics and Vision. IEEE, 2006. (Year: 2006).*

Grudic, Gregory Z., and Peter D. Lawrence. "Human-to-robot skill transfer using the SPORE approximation." Proceedings of IEEE International Conference on Robotics and Automation. vol. 4. IEEE, 1996. (Year: 1996).*

Rezvani, Tara, et al. "Towards trustworthy automation: User interfaces that convey internal and external awareness." 2016 IEEE 19th International conference on intelligent transportation systems (ITSC). IEEE, 2016. (Year: 2016).*

Guenter, Florent, et al. "Reinforcement learning for imitating constrained reaching movements." Advanced Robotics 21.13 (2007): 1521-1544. (Year: 2007).*

Suleman, Muhammad Umar, and Mian M. Awais. "Learning from demonstration in robots: Experimental comparison of neural architectures." Robotics and Computer-Integrated Manufacturing 27.4 (2011): 794-801. (Year: 2011).*

Suay, Halit Bener, and Sonia Chernova. "Effect of human guidance and state space size on interactive reinforcement learning." 2011 Ro-Man. IEEE, 2011. (Year: 2011).*

Guenter, Florent, and Aude G. Billard. "Using reinforcement learning to adapt an imitation task." 2007 IEEE/RSJ International Conference on Intelligent Robots and Systems. IEEE, 2007. (Year: 2007).*

Hersch, Micha, et al. "Learning dynamical system modulation for constrained reaching tasks." 2006 6th IEEE-RAS International Conference on Humanoid Robots. IEEE, 2006. (Year: 2006).*

\* cited by examiner

METHOD AND DEVICE FOR A COMPUTERIZED MECHANICAL DEVICE

RELATED APPLICATIONS

This application claims the benefit of priority under 35 USC § 119(e) of U.S. Provisional Patent Application No. 62/429,814 filed Dec. 4, 2016, the contents of which are incorporated herein by reference in their entirety.

FIELD AND BACKGROUND OF THE INVENTION

The present invention, in some embodiments thereof, relates to a computerized mechanical device executing a deep learning neural network and, more specifically, but not exclusively, to a computerized mechanical device trained to perform complex human tasks.

One definition of a robot is a machine designed to execute one or more tasks automatically with speed and precision. Some robots are computerized, comprising at least one hardware processor. An increasing amount of tasks commonly performed by humans can now also be performed by a computerized mechanical device, for example a robot.

Machine learning refers to getting a computer to act without being explicitly programmed. Recent fields where machine learning is used include autonomous driving cars (also known as self-driving cars), speech recognition and web searches. In some systems comprising a computerized mechanical device, instead of, or in addition to, designing a hard coded algorithm for performing an identified task, machine learning is used to train a computerized mechanical device to perform the task. A system implementing machine learning may automatically construct an algorithm (also referred to as building a model) representing a computerized mechanical device's interaction with an identified environment, by using algorithms that iteratively learn from data without explicitly being programmed where to look.

A typical computerized mechanical device comprises a plurality of sensors for capturing a state of the environment in which the computerized mechanical device operates and one or more controllers for the computerized mechanical device to operate. Examples of sensors are a light sensor, a camera, a sound sensor such as a microphone, a temperature sensor, a contact sensor, a proximity sensor, a distance sensor, a global positioning sensor, a tilt sensor, a pressure sensor, an acceleration sensor, a gyroscope, an electrical current sensor, and an electrical voltage sensor. A mechanical device operation may comprise instructing the one or more controllers. Some controllers control movement of a physical object such as a member of the robot, for example moving an arm of the computerized mechanical device or increasing and decreasing a distance between two or more members of the computerized mechanical device (to mimic a pincer operation). Some controllers deliver one or more instructions to another computerized device.

As used herein, the term robot means a computerized mechanical device and the terms are used interchangeably.

SUMMARY OF THE INVENTION

It is an object of the present invention to provide a system and method for training and using a computerized mechanical device to perform at least one complex human task.

The foregoing and other objects are achieved by the features of the independent claims. Further implementation forms are apparent from the dependent claims, the description and the figures.

According to a first aspect of the invention, a method for training a computerized mechanical device's neural network dataset comprises: receiving data documenting a plurality of actions of an actuator performing a target task in a plurality of initial iterations; calculating using the data a neural network dataset having a plurality of neural network parameters and used for performing the target task; gathering in a plurality of reward training iterations a plurality of scores given by an instructor to a plurality of world states, each world state comprising at least one sensor output value, while a robotic actuator performs the target task according to the neural network dataset; calculating using the plurality of scores a reward neural network dataset having a second plurality of neural network parameters and used for computing a reward function; updating at least some of the plurality of neural network parameters by receiving in each of a plurality of policy training iterations a reward value computed by applying the reward function to another world state comprising at least one sensor output value, while the robotic actuator performs the target task according to the neural network dataset; and outputting the updated neural network dataset.

According to a second aspect of the invention, a system for training a computerized mechanical device's neural network dataset comprises: at least one hardware processor, executing at least one neural network comprising a plurality of convolutional layers; at least one sensor electrically connected to an input of the at least one hardware processor; and at least one controller, connected to an output of the at least one hardware processor. The at least one hardware processor is adapted to: receive data documenting a plurality of actions of an actuator performing a target task in a plurality of initial iterations; calculate using the data a neural network dataset having a plurality of neural network parameters and used for performing the target task; gather in a plurality of reward training iterations a plurality of scores given by an instructor to a plurality of world states, each world state comprising at least one sensor output value received from the at least one sensor, while a robotic actuator performs the target task according to the neural network dataset; calculate using the plurality of scores a reward neural network dataset having a second plurality of neural network parameters and used for computing a reward function; update at least some of the plurality of neural network parameters by receiving in each of a plurality of policy training iterations a reward value computed by applying the reward function to another world state comprising at least one sensor output value received from the at least one sensor, while the robotic actuator performs the target task according to the neural network dataset; and output the updated neural network dataset.

According to a third aspect of the invention, a method for a computerized mechanical device comprises: accessing a neural network data set generated by: receiving data documenting a plurality of actions of an actuator performing a target task in a plurality of initial iterations; calculating using the data a neural network dataset having a plurality of neural network parameters and used for performing the target task; gathering in a plurality of reward training iterations a plurality of scores given by an instructor to a plurality of world states, each world state comprising at least one sensor output value, while a robotic actuator performs the target task according to the neural network dataset; calculating using the plurality of scores a reward neural network dataset having a second plurality of neural network parameters and used for computing a reward function; updating at least some of the plurality of neural network parameters by receiving in each of a plurality of policy training iterations a reward value computed by applying the reward function to another world state comprising at least one sensor output value, while the robotic actuator performs the target task according to the neural network dataset; and outputting the updated neural network dataset; receiving a plurality of sensor output values; and instructing at least one controller to perform one or more of an identified set of controller actions according to the updated neural network dataset in response to receiving the plurality of sensor output values.

According to a fourth aspect of the invention, a computer implemented method for computing a reward function comprises: performing by a robotic actuator a target task according to a neural network dataset; while the robotic actuator performs the target task, gathering a plurality of scores given by an instructor to a plurality of world states, each world state comprising at least one sensor output value, by in each of a plurality of reward training iterations: receiving a world state comprising at least one sensor output value; presenting on a visual display device to an instructor the at least one sensor output value; receiving from the instructor via an input device a score given by the instructor to the world state; and creating a mapping between the world state and the score; and calculating using the plurality of scores and the plurality of world states a reward neural network dataset having a plurality of neural network parameters and used for computing a reward function.

With reference to the first and second aspects of the invention, in a first possible implementation of the present invention performing the target task comprises instructing at least one controller to perform one or more of an identified set of controller actions and the at least one controller controls movement of a vehicle. The at least one sensor is selected from a group consisting of: a light sensor, a camera, a sound sensor, a microphone, a temperature sensor, a contact sensor, a proximity sensor, a distance sensor, a global positioning sensor, a tilt sensor, a pressure sensor, an acceleration sensor, a gyroscope, an electrical current sensor, and an electrical voltage sensor. Optionally, the data comprises a plurality of sensor output values and a plurality of controller actions instructed by the actuator to perform the target task. Safely and accurately performing a complex human task such as controlling movement of a vehicle may be increased by receiving a plurality of sensor output values from a plurality of sensors of a variety of sensor types.

With reference to the first and second aspects of the invention, in a second possible implementation of the present invention the reward value is in a predefined range of reward values. Optionally, each of the plurality of scores is a value selected from the set consisting of $-1$ and $1$, and the predefined range of reward values is from $-1$ to $1$, including $-1$ and $1$. Using only two possible reward scores may simplify the instructor's interaction with the robot, and thus may simplify a training process of a reward function.

With reference to the first and second aspects of the invention, in a third possible implementation of the present invention the method further comprises: gathering in a plurality of safety training iterations a plurality of safety scores given by a safety instructor to a plurality of safety states, each safety state comprising at least one other sensor output value, while the robotic actuator performs the target task according to the neural network dataset; and calculating using the plurality of safety scores a safety neural network dataset having a third plurality of neural network parameters and used for computing a safety function. Updating the at least some of the plurality of neural network parameters further comprises: receiving in each of the plurality of policy training iterations a safety value computed by applying the safety function to the other world state, while the robotic actuator performs the target task according to the neural network dataset; and identifying at least one safe controller action subject to the safety value being less than an identified threshold safety value. Optionally, the at least one safe controller action is identified according to the neural network dataset calculated using the data. The safety value is in a predefined range of safety values. Optionally, the safety score is a value selected from the set consisting of $-1$ and $1$ and the predefined range of safety values is from $-1$ to $1$, including $-1$ and $1$. Using a safety function in updating the neural network dataset may improve accuracy of a resulting neural network policy and may accelerate a training process by eliminating exploration of unwanted world states. Using only two possible safety scores may simplify the instructor's interaction with the robot, and thus may simplify a training process of a safety function.

With reference to the first and second aspects, in a fourth possible implementation of the first and second aspects, the method further comprises receiving a preliminary plurality of sensor output values; and calculating a preliminary feature neural network dataset used for identifying a preliminary set of features of an environment of the robotic actuator. Calculating the neural network dataset further comprises using the preliminary feature neural network dataset. In addition, the method further comprises, while calculating the neural network dataset, calculating a revised feature neural network dataset used for identifying a revised set of features of an environment of the robotic actuator. Calculating the reward neural network dataset further comprises using the revised feature neural network dataset, and updating the at least some of the plurality of neural network parameters further comprises using the revised feature neural network dataset. Using a preliminary feature dataset may accelerate a training process of the neural network dataset, and using information gathered while calculating the neural network dataset in training the reward neural network and in updating the neural network dataset my further accelerate these two processes and increase accuracy of a performance of a robot using a resulting neural network datasets.

With reference to the first and second aspects, in a fifth possible implementation of the first and second aspects, the method further comprises repeating in each of one or more iterations: gathering in a plurality of new reward training iterations a plurality of new scores given by the instructor to a plurality of new world states, each new world state comprising at least one new sensor output value, while the robotic actuator performs the target task according to the updated neural network dataset; calculating using the plurality of new scores a new reward neural network dataset having a fourth plurality of neural network parameters and used for computing a new reward function; and updating at least some of the plurality of neural network parameters by receiving in each of a plurality of new policy training iterations a new reward value computed by applying the new reward function to a new other world state comprising at least one new sensor output value, while the robotic actuator performs the target task according to the updated neural network dataset. Repeating these training steps in a plurality of iterations may improve accuracy of a performance of a robot using a resulting neural network dataset.

With reference to the first and second aspects, in a sixth possible implementation of the first and second aspects, at least one Q-Learning method is used while updating the at least some of the plurality of neural network parameters.

With reference to the first and second aspects, in a seventh possible implementation of the first and second aspects, the gathering a plurality of scores comprises: receiving a world state comprising at least one sensor output value; presenting on a visual display device to an instructor the at least one sensor output value; receiving from the instructor via an input device a score given by the instructor to the world state; and creating a mapping between the world state and the score. Interacting with an instructor to gather the plurality of scores may expedite transferring human knowledge to the robot.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
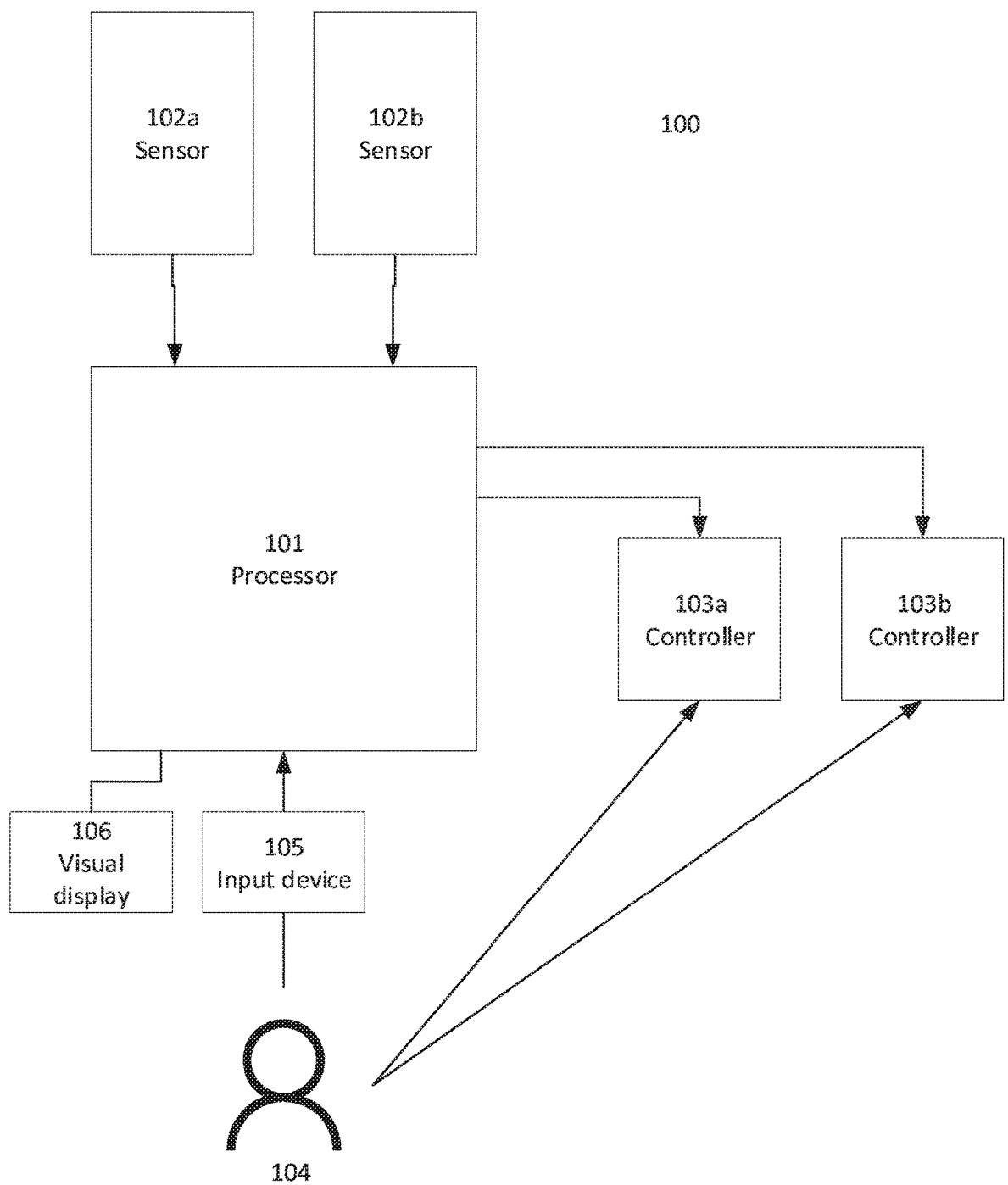
FIG. 1 is a schematic block diagram of an exemplary robot, according to some embodiments of the present invention.

The following description focuses on a robot trained to perform one or more complex human tasks, however the present invention is not limited to human tasks and may apply to any task in an environment observable by one or more sensors.

There exist tasks which are natural to perform by an adult human but for which designing a hard coded algorithm for a robot to perform may be challenging, for example ironing clothes and driving a car. Challenges include accurately modeling the robot's interactions with the environment, creating combined features from a plurality of inputs from the plurality of sensors and automatically adapting the robot to new situations. An alternative to explicitly programming a robot to perform one or more tasks is to use machine learning to automatically construct an algorithm (also referred to as building a model) representing the robot's interaction with the environment.

As used herein, the term learning technique means a learning method and the terms learning technique and learning method are used interchangeably.

Some machine learning techniques are reinforcement learning (RL) techniques. In RL, a set of reward signals is received by the robot during the robot's interaction with the environment. In some RL techniques the robot aims to maximize one or more reward values, determined by a formally defined reward function and received by the robot during the robot's continuous interaction with the environment. Machine learning may incur some risks to the robot and the environment, in that an undesirable operation performed by the robot might damage the robot itself or part of the environment. RL techniques have an advantage of allowing iterative automatic learning by the robot. However, RL techniques are typically unsupervised, not involving a human instructor, and thus risk damage to the robot or the environment during the learning process.

In the context of robot learning, supervised learning refers to some machine learning techniques including a human instructor. Such techniques aim to expedite a robot's learning process by explicitly delivering human knowledge to the robot. Some machine learning techniques include imitation learning (IL), where a human demonstrator performs a desired task with a goal of teaching a robot to mimic the demonstrator's actions. In some IL techniques, a plurality of demonstrations are used by the robot to learn a mapping from an identified world state, received by the plurality of sensors from the identified environment, to a desired action consisting of instructions to the plurality of controllers. Such techniques introduce to the robot correct input-output pairs, matching an input set of observations with one or more actions taken by the instructor, at an identified time. As used henceforth, the term world state means a state of the environment. The observations are information about the environment captured by the plurality of sensors, describing a world state. One objective of IL is to minimize the risk to the robot and the environment in which the robot operates during the learning process by relying on correct instructor behavior. However, IL techniques are limited by the set of environment states encountered during the learning process and by the quality of the instructor's demonstrations. If the training sample isn't sufficiently diverse or sufficiently representative of the possible environment states the robot is not exposed to unexpected difficult states. The result of this may be poor and unpredictable performance when such states are encountered by the robot when it operates in the environment in production (that is, not while being trained). Poor instructor demonstrations may also result in poor performance in production.

Some robot systems combine IL techniques with RL techniques. In some systems comprising a robot, learning (both IL and RL) may be performed using a simulator. Using a simulator helps reduce risk of damage to the robot and to the environment in which the robot operates. For example, an undesired operation in a robot driven car operating on a real road may result in damage to the car, destruction of the car, damage to another car or a person's injury. Such damage may be expensive and significantly increase costs of robot development, and in some cases may prevent training the robot in an actual physical environment (for example due to risk to people). In addition, there may be cases where an appropriate physical environment is not readily available for training, for example deep water or extreme temperature conditions.

A possible way to train a robot is by using a simulator of the environment. However, in complex and changing real environments, some simulators frequently do not capture the full complexity of the environment and might not change sufficiently to correctly represent the environment they simulate.

The present invention, in some embodiments thereof, expedites transferring human knowledge to the robot and/or reduces risk of damage during a RL process by adding a supervised reward induction process to generate a reward function for use in a RL process performed following an IL process. In the supervised reward induction process the robot learns a reward function from instructor feedback delivered to the robot while the instructor observes the robot operating in an environment using a policy previously learned using the IL process. The instructor feedback is optionally delivered to the robot via an input device of the robot, for example a keyboard, a keypad or a touch screen. A policy is a rule that the robot follows in selecting one or more actions, given a state the robot is in. In some embodiments of the present invention the policy is executed by a machine learning software module. Optionally, the policy comprises a neural network dataset. A reward function resulting from allowing the robot to learn the reward function from human instruction may be more encompassing than possible to formally define. Such a reward function may increase the speed at which the robot learns to perform its task well compared to using a formally defined reward function. In addition, an instructor may be able to provide coherent feedback about the quality of a performance the instructor themselves may not be able to perform well, similar to a sports coach able to evaluate performance of an athlete running at a speed the coach cannot run at. Thus, using some embodiments of the present invention allows training a robot to exceed the human instructor (or any human) in performance.

In addition, some embodiments of the present invention use a safety module in the RL process. A safety module comprises a safety function for the purpose of classifying an input world state as safe or unsafe, and a safety policy for determining one or more robot actions when identifying an unsafe state. Combining a safety module with an inducted reward function allows improving the robot's exploration of a world state space, comprising a plurality of possible world states, and accelerating learning by reducing an amount of time used by the robot to explore unimportant regions of the state space that an optimal robot policy would not encounter.

Neural networks are increasingly used in machine learning. In a neural network, information about an environment, captured by one or more sensors, is received by the neural network and processed to produce a plurality of features identified in the environment. In neural networks receiving one or more images as input, a feature may be a classification of an object identified in one or more images (for example a cat, a table and a roadside) or a parameter (for example a distance from a roadside and an angle with respect a road).

There exist methods for learning a reward function in a supervised manner using manual feature generation by experts. In such methods, the reward function is learned from some externally defined low-dimensional feature representations of the world states. Construction of such low-dimensional representations usually requires some expert domain knowledge, reducing the advantages in automatic learning of the reward function. The present invention, in some embodiments thereof, allows a machine learning module to learn the reward function directly from the raw sensor input information using a binary instructor label for each input state. Domain knowledge required to label a state is significantly less than the knowledge required to produce a low-dimensional representation of the state. For example, a human may easily identify from a visual image that a car is too close to the roadside (that is, the state is bad), without providing specific distance values defining what distance is good and what distance is bad. After receiving a set of labeled input states, the robot may learn a reward function by a process of induction from the input set of labeled states. The learned reward function may generalize the human instructions for states unseen during the induction process. The present invention simplifies a supervised learning process of a reward function by substituting it with a supervised induction process, requiring simpler input data, faster to produce and easier to come by.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary robot 100, according to some embodiments of the present invention. In such embodiments, the robot comprises at least one hardware processor 100, electrically connected to one or more sensors 102a and/or 102b. Examples of sensors are a light sensor, a camera, a sound sensor such as a microphone, a temperature sensor, a contact sensor, a proximity sensor, a distance sensor, a global positioning sensor, a tilt sensor, a pressure sensor, an acceleration sensor, a gyroscope, an electrical current sensor, and an electrical voltage sensor. Optionally, the one or more sensors capture information about an environment and deliver a plurality of sensor values to the at least one hardware processor. For example, the robot may be used to control a vehicle. In embodiments where the robot controls a vehicle, at least one of the one or sensors is optionally a camera directed significantly forward of the vehicle in the vehicle's direction of movement. In such embodiments, the camera may capture a plurality of images of the environment in which the vehicle moves. In such embodiments, at least one of the one or more sensors is optionally a proximity sensor, capturing a plurality of distance values of the vehicle from one or more objects in the environment such as another vehicle or a person. Optionally, at least one controller 103a and/or 103b are attached to one or more outputs of the at least one hardware processor. The at least one hardware processor optionally instructs the controller to perform one of an identified set of controller actions. For example, in embodiments where the robot controls a vehicle, the at least one controller optionally controls the vehicle's steering, and the identified set of controller actions optionally comprises an instruction to displace the vehicle's steering to an certain angle relative to an identified origin, for example 3 degrees or 354 degrees. Another example of a controller in a robot for controlling a vehicle is a decelerator controller. In the latter example the set of controller actions may comprise an amount of force to apply to the decelerator for the purpose of changing the vehicle's velocity.

Optionally, at least one input device 105 is connected to at least one hardware processor 101, for the purpose of delivering input from a human instructor, or user, 104 to the at least one hardware processor. Examples of an input device are a keyboard, a microphone, a keypad and a touch screen. In some embodiments of the present invention, human instructor 104 delivers a plurality of instructions to at least one controller 103a and/or 103b during one or more supervised training sessions. In addition, in some embodiments of the present invention the human instructor delivers feedback to the at least one hardware processor using at least one input device 105 during one or more other supervised training sessions.

Optionally, at least one visual display is connected to at least one hardware processor 101 for the purpose of displaying one or more sensor output values received from at least one sensor 102a and/or 102b to human instructor 104.

Operation of a robot typically comprises repeatedly receiving a world state comprising a plurality of sensor output values, selecting one or more operations to perform in response to the world state according to a robot policy and instructing one or more controllers to perform the selected one or more operations. In order to operate robot 100, in some embodiments of the present invention the at least one hardware processor implements the following method.

Figure 2:
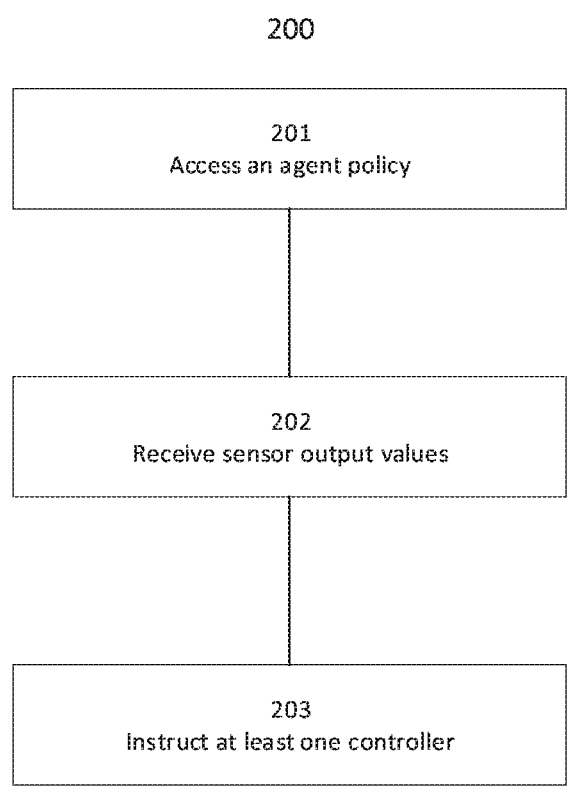
FIG. 2 is a flowchart schematically representing an optional flow of operations for operating a robot, according to some embodiments of the present invention.

Reference is now made also to FIG. 2, showing a flowchart schematically representing an optional flow of operations 200 for operating a robot, according to some embodiments of the present invention. In such embodiments, in 201 the at least one hardware processor accesses a policy for governing the robot's actions, in 202 receives a plurality of sensor output values from one or more sensors 102a and/or 102b and in 203 instructs at least one controller 103a and/or 103b to perform one or more of an identified set of controller actions according to the robot policy in response to receiving the plurality of sensor output values. The robot policy may be a policy generated by the robot. Optionally, the robot policy is generated by another robot or another system and is accessed by at least one hardware processor 101.

To train the robot, that is to generate a robot policy, in some embodiments of the present invention system 100 implements the following optional method. In some other embodiments of the present invention, the following method is implemented by another robot comprising at least one other hardware processor, electrically connected to one or more other sensors, and at least one other controller connected to one or more outputs of the at least one other hardware processor. A neural network dataset output by the other robot may be used by at least one hardware processor 101 in system 100.

Figure 3:
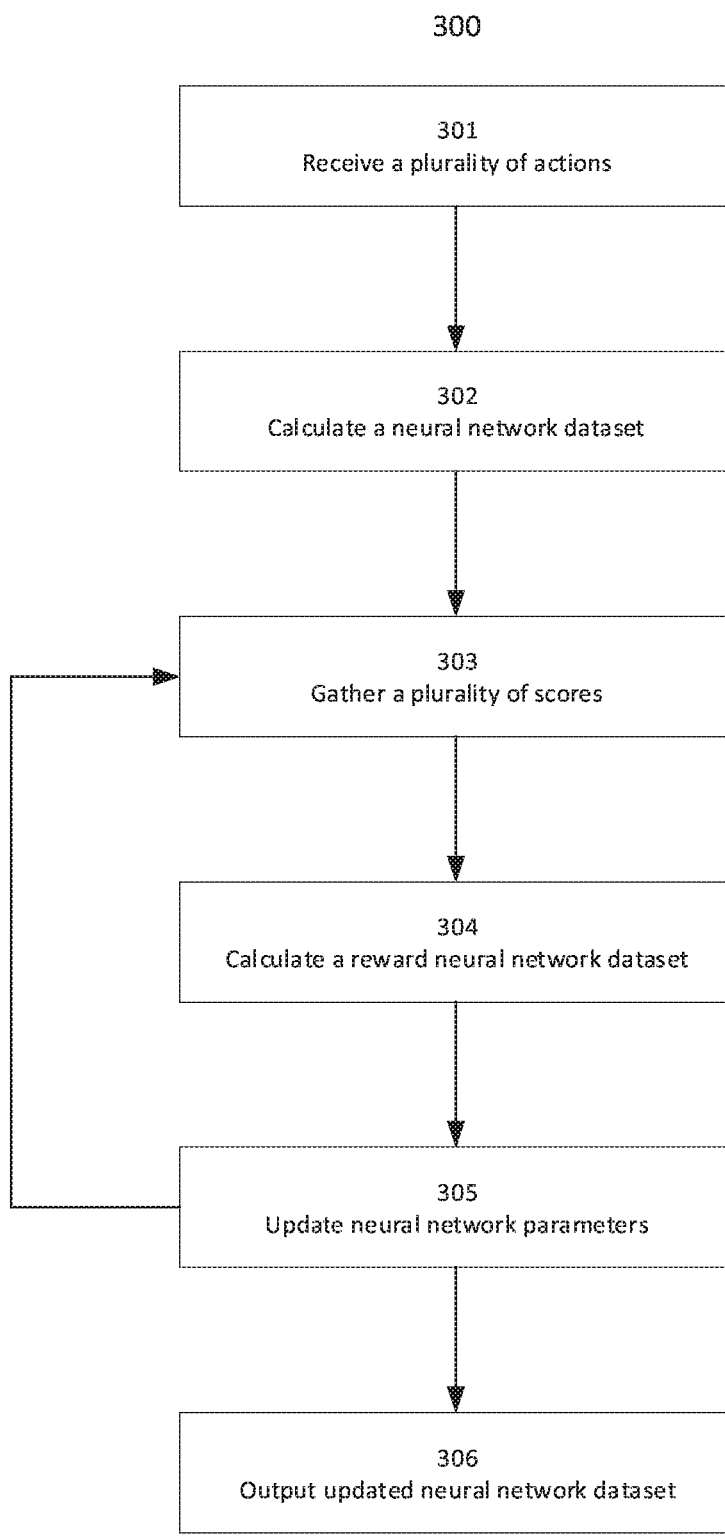
FIG. 3 is a flowchart schematically representing an optional flow of operations for training a robot, according to some embodiments of the present invention.

Reference is also made to FIG. 3, showing a flowchart schematically representing an optional flow of operations 300 for training a robot, according to some embodiments of the present invention. In such embodiments, at least one hardware processor 101 receives data documenting a plurality of actions of an actuator performing a target task in a plurality of initial iteration. The actuator is optionally user 104. Optionally, the target task comprises instructing at least one controller 103a and/or 103b to perform one or more of an identified set of controller actions. Examples of actions and controller actions are displacing a vehicle's steering to a certain angle relative to an identified origin and applying force to a vehicle's decelerator or accelerator. Optionally the data comprises a plurality of sensor output values and a plurality of controller actions instructed by the actuator to perform the target task. Examples of sensor output values are an image captured by a camera and a distance value measured by a proximity sensor.

Optionally, in 302 at least one hardware processor 101 uses the data received in 301 to calculate a neural network dataset having a plurality of neural network parameters. The neural network dataset is optionally aimed at mimicking the human instructor's performance and may be used for performing the target task. Optionally, the neural network dataset is recorded in a non-volatile storage such as a hard disk or a network storage, connected to at least one hardware processor 101. The digital memory may be a Random Access Memory (RAM).

Next, in 303, at least one hardware processor 101 optionally gathers, in a plurality of reward training iterations, a plurality of scores given by an instructor to a plurality of world states while a robotic actuator performs the target task according to the neural network dataset calculated in 302. The instructor giving the plurality of scores may be, be is not mandated to be, the instructor performing the target task in 302. Optionally, the robotic actuator is a computerized mechanical device (a robot). Optionally, system 100 is the robotic actuator. Optionally, each world state comprises at least one sensor output value received from at least one sensor 102a and/or 102b. For example, at least one sensor 102a and/or 102b may be one or more cameras connected to at least one hardware processor 101, and a sensor output value may be an image captured by the one or more cameras. Optionally, the at least one sensor output value is presented to the instructor on at least one visual display 106, and the instructor delivers the plurality of scores to at least one hardware processor 101 via at least one input device 105. In some embodiments, while the robotic actuator performs the target task according to the neural network dataset calculated in 302, in each of the plurality of reward iterations at least one hardware processor 101 receives a world state of the plurality of world states by receiving at least one sensor output value from at least one sensor 102a and/or 102b, presents the at least one sensor output value to the instructor on at least one visual display 106, and receives from the instructor via at least one input device 105 the score given by the instructor to the world state. Optionally, at least one hardware processor 101 creates a mapping between the world state and the score. Optionally, each of the plurality of scores is a value selected from the group consisting of −1 and 1. In such embodiments, a value of −1 denotes the lowest possible reward and 1 denotes the highest possible reward. Using only two possible reward scores may simplify the instructor's interaction with the robot, and thus may simplify a training process. Next, in 304, at least one hardware processor optionally calculates, using the plurality of scores, a reward neural network dataset having a second plurality of neural network parameters. The reward neural network dataset is optionally used for computing a reward function. Optionally, the reward function computes for an input state a reward real value in a predefined range of reward values, for example between −1 and 1, including −1 and 1. It is to be noted that the reward neural network dataset is calculated in some embodiments using the plurality of sensor output values of the plurality of world states, and not using a plurality of externally identified features of the environment in which the robot operates. Optionally, the reward neural network dataset is recorded in a non-volatile storage such as a hard disk or a network storage, connected to at least one hardware processor 101. The digital memory may be a Random Access Memory (RAM).

Next, in 305 at least one hardware processor 101 improves the neural network dataset for performing the target task by updating at least some of the plurality of neural network parameters by receiving in each of a plurality of policy training iterations a reward value computed by applying the reward function calculated in 304 to another world state comprising at least one sensor output value, while the robotic actuator performs the target task according to the neural network dataset, and in 306 optionally outputs the updated neural network dataset. In some reinforcement learning methods at least one hardware processor 101, in each of the plurality of policy training iterations, may operate by receiving a training world state comprising a plurality of sensor output values from the one or more training sensors and instructing the at least one training controller to perform one or more actions according to the neural network dataset. The at least one hardware processor may learn an improved robot policy by updating at least some of the plurality of neural network parameters, having an aim of maximizing a long term accumulated reward value, accumulated over a certain period of time of the plurality of policy training iterations.

Optionally, at least one hardware processor 101 repeats steps 303, 304 and 305 in each of one or more iterations. The updated neural network dataset resulting after such multiple iterations may increase the quality of the robot's performance of the target task.

Some embodiments of the present invention combine using a safety function with the reward function in updating the neural network dataset. Optionally, in such embodiments system 100 further implements the following method for training the robot.

Figure 4:
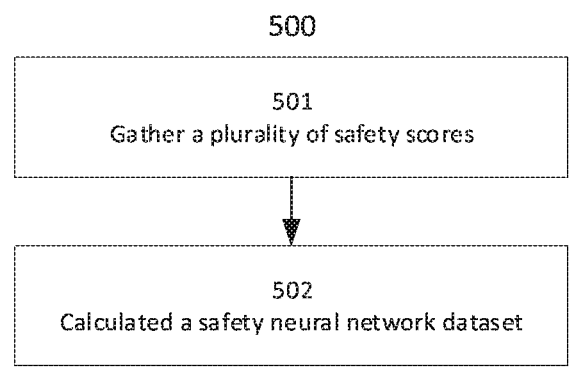
FIG. 4 is a flowchart schematically representing an optional flow of operations for learning a safety function, according to some embodiments of the present invention.

Reference is now made also to FIG. 4, showing a flowchart schematically representing an optional flow of operations 500 for calculating a safety function, according to some embodiments of the present invention. In such embodiments, in 501 at least one hardware processor gathers, in a plurality of safety training iterations, a plurality of safety scores given by a safety instructor, for example user 104, to a plurality of safety states while the robotic actuator performs the target task according to the neural network dataset. Optionally, each safety state comprises at least one other sensor output value, received from at least one sensor 102a and/or 102b. For example, the at least one other sensor output value may be an image captured by one or more cameras connected to at least one hardware processor 101. Optionally, each of the plurality of safety scores is a value selected from the group consisting of −1 and 1. In such embodiments, a value of −1 denotes a very unsafe state, and 1 denotes a very safe state. An example of an unsafe state is a state that could lead to an accident. An example of a safe state is correct positioning in a driving lane. In 502, at least one hardware processor 101 optionally calculates, using the plurality of safety scores, a safety neural network dataset having a third plurality of neural network parameters. The safety neural network is optionally used for computing a safety function. Optionally, the safety function computes for an input state a safety real value in a predefined range of safety values, for example between −1 and 1, including −1 and 1. It is to be noted that the safety function is learned in some embodiments from the plurality of sensor output values, and not from a plurality of externally identified features of the environment in which the robot operates, or manually formalized by an expert. The method for learning the safety function may be similar to the method for learning the reward function, using separate input sets of states. Optionally, the safety neural network dataset is recorded in a non-volatile storage such as a hard disk or a network storage, connected to at least one hardware processor 101. The digital memory may be a Random Access Memory (RAM).

In embodiments having a safety function, the safety function may be used when updating the plurality of neural network parameters of the neural network dataset. In such embodiments, system 100 further implements the following optional method.

Figure 5:
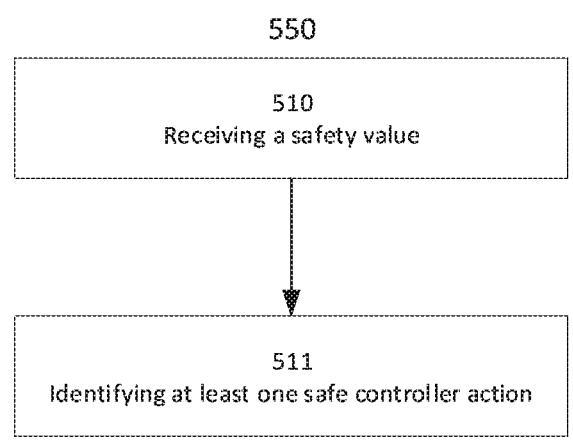
FIG. 5 is a flowchart schematically representing an optional flow of operations using a safety function when updating a neural network dataset, according to some embodiments of the present invention.

Reference is now made also to FIG. 5, showing a flowchart schematically representing an optional flow of operations 550 for using a safety function when updating a neural network dataset, according to some embodiments of the present invention. In such embodiments, step 305 further comprises in 510 receiving in each of the plurality of policy training iterations a safety value computed by applying the safety function calculated in flow of operations 500 to the other world state, while the robotic actuator performs the target task according to the neural network dataset, and in 511 identifying at least one safe controller actions subject to the safety value being less than an identified threshold safety value. When the safety value is a value between −1 and 1, the identified threshold safety value may be an identified value between −1 and 1, for example 0.75 or 0.5. An example of a safe controller action is applying an identified amount of force to a vehicle's decelerator (to stop the vehicle). Another example of a safe controller action is displacing the vehicle's steering to a certain angle relative to a current direction of the vehicle's steering. Optionally, the at least one safe controller action is identified according to the neural network dataset calculated in 302.

Training of the neural network dataset may be accelerated, and the accuracy of the robot's performance of the target task may be increased, by using a plurality of preliminary features identified in the environment of the robot. Examples of a preliminary feature are a road boundary, an angle of a car with respect to a road, a distance of a car from a road boundary, a car velocity, and an amount of erosion of a car's tire. The following optional method may be implemented in system 100 to use preliminary features when training the robot.

Figure 6:
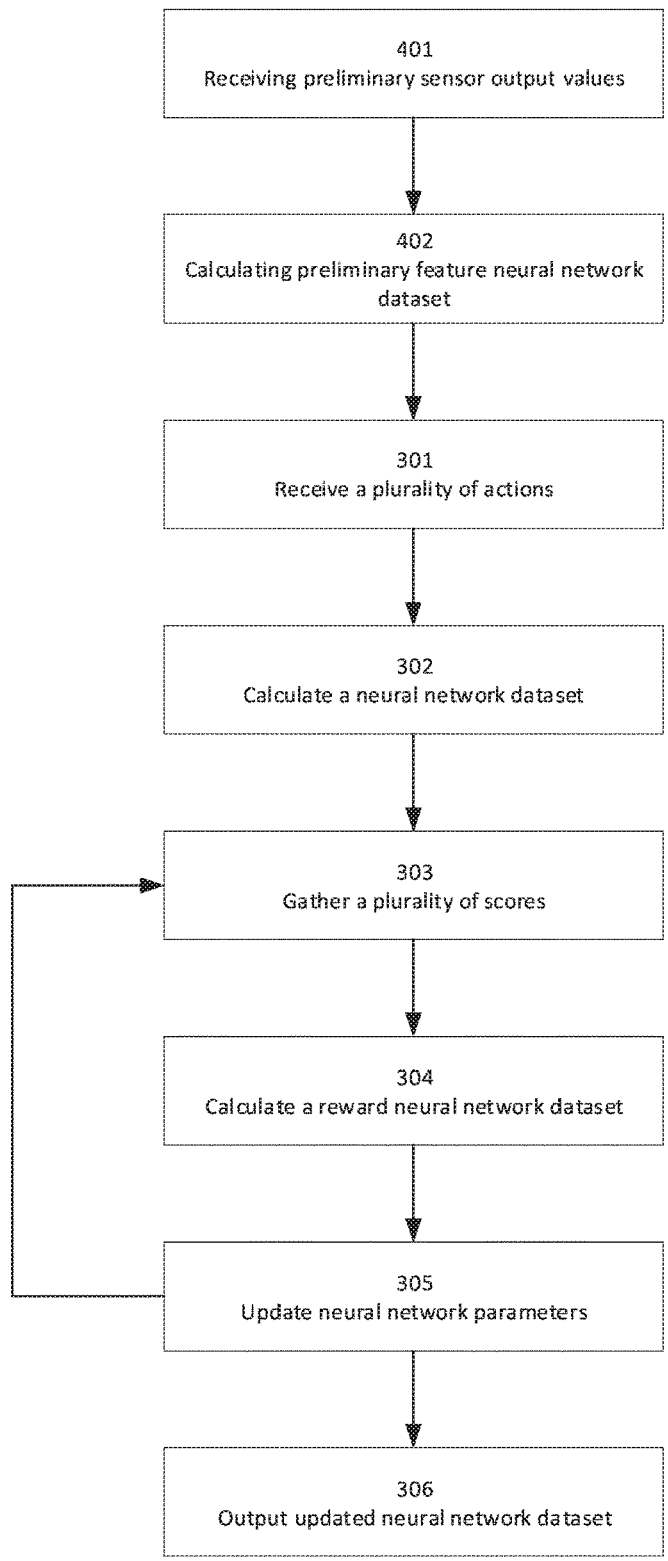
FIG. 6 is a flowchart schematically representing an optional flow of operations for training a robot using preliminary features, according to some embodiments of the present invention.

Reference is now made also to FIG. 6, showing a flowchart schematically representing an optional flow of operations 400 for training a robot using preliminary features, according to some embodiments of the present invention. In such embodiments, in 401 at least one hardware processor 101 receives a preliminary plurality of sensor output values, and in 402 calculates a preliminary feature neural network dataset used for identifying a preliminary set of features of an environment of the robotic actuator. The preliminary feature neural network dataset is optionally used in 302 in combination with the plurality of actions received in 301 to calculate the neural network dataset.

In some embodiments of the present invention, while calculated the neural network dataset in 302, at least one hardware processor 101 additionally calculates a revised feature neural network dataset, used for identifying a revised set of features of an environment of the robotic actuator. Optionally, calculating the neural network dataset in 302 and updating the plurality of neural network parameters in 305 further comprise using the revised neural network dataset. Using a revised set of features in training the robot may improve accuracy of the robot's performance of the target task.

In some embodiments of the present invention, at least one hardware processor 101 executes one or more neural networks. Optionally, the one or more neural networks comprise a reward convolutional neural network (CNN) and the reward function is learned by the reward CNN. In machine learning, a convolutional neural network is a type of neural network comprising an input and an output layer, as well as multiple hidden layers. CNNs have been proven effective in areas such as image recognition and classification.

In embodiments where the at least one hardware processor executes one or more neural networks for training the robot, the one or more neural networks may be connected as follows.

Figure 7:
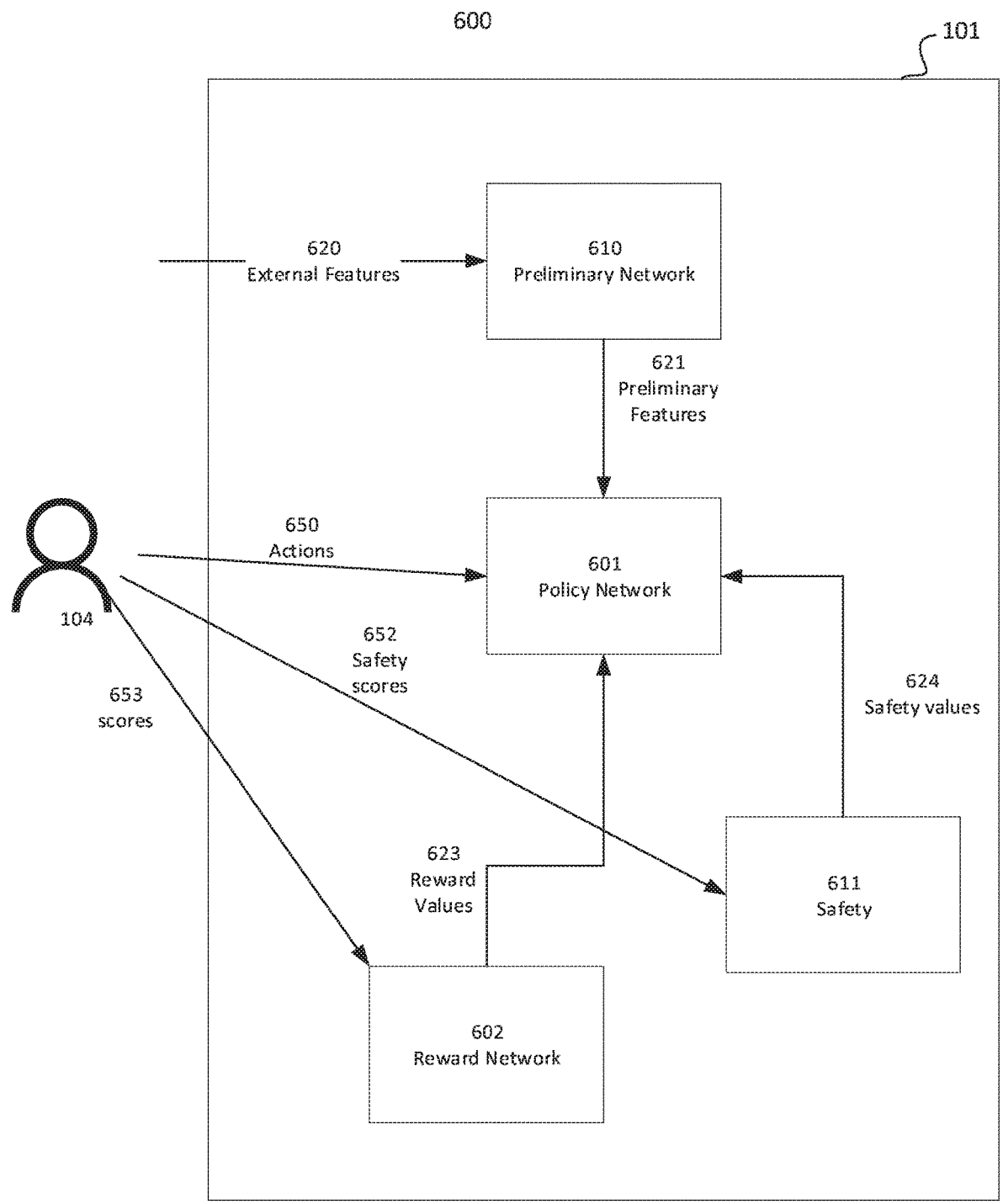
FIG. 7 is a schematic block diagram of a partial exemplary robot comprising one or more neural networks, according to some embodiments of the present invention.

Reference is now made to FIG. 7, showing a schematic block diagram 600 of a partial exemplary robot, according to some embodiments of the present invention, comprising multiple neural networks. In such embodiments, a policy neural network 601 is used to learn an initial robot policy by observing a plurality of operations 650 performed by user 104. The policy neural network may be a first CNN. User 104 optionally delivers reward neural network 602 with a plurality of scores 653 used for learning a reward function. The reward neural network may be a second CNN. Optionally, policy network 601 learns a revised robot policy using one or more reward values 623 received from reward neural network 602. Optionally, policy network 601 applies a Q-learning method to learn the revised robot policy, using the initial robot policy and one or more reward values 623 received from reward network 602. Q-learning is a model-free reinforcement learning technique, working by learning an action-value function for taking a given action in a given state and following an optimal policy thereafter.

Optionally, policy network 601 is initialized with a set of preliminary features 621, generated by a third CNN 610 executing at least one unsupervised learning method as known in the art. Optionally, preliminary network 610 receives a set of external features 620. The external features may comprise features generated by an expert in the domain the robot operates in, for example road boundaries. Optionally, the external features comprise a plurality of engineered features obtained from professional feature manufacturers. Using external features may accelerate the robot's learning process by eliminating the time required to automatically learn the features composing the external features.

In some embodiments of the present invention, a safety module 611 is used to accelerate the robot's learning process by eliminating exploration of unwanted states. This is done by optionally using a safety function to compute a safety value for every training state received by the policy network from one or more sensors. When the safety value is greater than an identified safety threshold the state is considered safe, and the revised policy network may be allowed to operate according to its policy. When the safety value is below the identified safety threshold the state is considered unsafe, and the safety module may deliver one or more safety controls 624 to the policy network. Optionally, the one or more safety controls comprise an instruction to ignore the revised policy network's policy. Optionally, the one or more safety controls comprise one or more controller instructions, determined according to a safety policy of the safety module. Optionally, the safety policy is the initial robot policy. Optionally, a fourth CNN of the safety module learns the safety function using a plurality of safety scores 652 delivered by the user.

Optionally, policy network 601 produces in addition to the initial robot policy a set of revised features. Optionally, the revised set of features is used by policy network 601 for learning the revised robot policy. Optionally, the revised set of features is used to initialize reward network 602 for learning the reward function.

In some embodiments of the present invention, learning the reward function and learning the improved robot policy may be repeated iteratively. In some embodiments, the improved robot policy is tested using a sequence of test input states.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant iterative learning methods and reinforcement learning methods will be developed and the scope of the terms "iterative learning method" and "reinforcement learning method" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for training a computerized mechanical device's neural network dataset, comprising:
   receiving data documenting a plurality of actions demonstrated by a demonstrating actuator performing a target task in a plurality of initial iterations;
   calculating using said data a neural network dataset having a plurality of neural network parameters and used for mimicking said demonstrated plurality of actions in performing said target task;
   gathering, in a plurality of reward training iterations of a robotic actuator performing said target task according to said neural network dataset, a plurality of scores given by an instructor to a plurality of world states, each world state comprising at least one sensor output value associated with said performance of said robotic actuator;
   calculating, using said plurality of scores, a reward neural network dataset having a second plurality of neural network parameters;
   computing, through machine learning, a reward function from said reward neural network dataset;
   receiving in each of a plurality of policy training iterations a reward value computed by applying said reward function to another world state, while said robotic actuator performs said target task according to said neural network dataset, wherein said another world state comprising at least one sensor output value;

gathering in a plurality of safety training iterations a plurality of safety scores given by a safety instructor to a plurality of safety states, each safety state comprising at least one other sensor output value, while said robotic actuator performs said target task according to said neural network dataset; and calculating using said plurality of safety scores a safety neural network dataset having a third plurality of neural network parameters and used for computing a safety function;

updating at least some of said plurality of neural network parameters based on said received reward value of each of said plurality of policy training iteration; and outputting said updated neural network dataset;

wherein updating said at least some of said plurality of neural network parameters further comprises:

receiving in each of said plurality of policy training iterations a safety value computed by applying said safety function to said another world state, while said robotic actuator performs said target task according to said neural network dataset; and identifying at least one safe controller action subject to said safety value being less than an identified threshold safety value.

2. The method of claim 1, wherein performing said target task comprises instructing at least one controller to perform one or more of an identified set of controller actions.

3. The method of claim 1, wherein said reward value is in a predefined range of reward values.

4. The method of claim 3, wherein each of said plurality of scores is a value selected from the set consisting of −1 and 1; and
wherein said predefined range of reward values is from −1 to 1, including −1 and 1.

5. The method of claim 1, wherein said at least one safe controller action is identified according to said neural network dataset calculated using said data.

6. The method of claim 1, wherein said safety value is in a predefined range of safety values.

7. The method of claim 6, wherein said safety score is a value selected from the set consisting of −1 and 1; and
wherein said predefined range of safety values is from −1 to 1, including −1 and 1.

8. The method of claim 2, wherein said data comprises a plurality of sensor output values and a plurality of controller actions instructed by said actuator to perform said target task.

9. The method of claim 1, further comprising:
receiving a preliminary plurality of sensor output values; and
calculating a preliminary feature neural network dataset used for identifying a preliminary set of features of an environment of said robotic actuator;
wherein calculating said neural network dataset further comprises using said preliminary feature neural network dataset.

10. The method of claim 1, further comprising, while calculating said neural network dataset, calculating a revised feature neural network dataset used for identifying a revised set of features of an environment of said robotic actuator;
wherein calculating said reward neural network dataset further comprises using said revised feature neural network dataset; and
wherein updating said at least some of said plurality of neural network parameters further comprises using said revised feature neural network dataset.

11. The method of claim 1, further comprising repeating in each of one or more iterations:
gathering in a plurality of new reward training iterations a plurality of new scores given by said instructor to a plurality of new world states, each new world state comprising at least one new sensor output value, while said robotic actuator performs said target task according to said updated neural network dataset;
calculating using said plurality of new scores a new reward neural network dataset having a fourth plurality of neural network parameters and used for computing a new reward function; and
updating at least some of said plurality of neural network parameters by receiving in each of a plurality of new policy training iterations a new reward value computed by applying said new reward function to a new other world state comprising at least one new sensor output value, while said robotic actuator performs said target task according to said updated neural network dataset.

12. The method of claim 1, wherein at least one Q-Learning method is used while updating said at least some of said plurality of neural network parameters.

13. The method of claim 1, wherein said gathering a plurality of scores comprises:
receiving a world state comprising at least one sensor output value;
presenting on a visual display device to an instructor the at least one sensor output value;
receiving from the instructor via an input device a score given by the instructor to the world state; and
creating a mapping between the world state and the score.

14. A system for training a computerized mechanical device's neural network dataset, comprising:
at least one hardware processor, executing at least one neural network comprising a plurality of convolutional layers;
at least one sensor electrically connected to an input of said at least one hardware processor; and
at least one controller, connected to an output of said at least one hardware processor;
wherein said at least one hardware processor is adapted to:
receive data documenting a plurality of actions demonstrated by a demonstrating actuator performing a target task in a plurality of initial iterations;
calculate using said data a neural network dataset having a plurality of neural network parameters and used for mimicking said demonstrated plurality of actions in performing said target task;
gather, in a plurality of reward training iterations of a robotic actuator performing said target task according to said neural network dataset, a plurality of scores given by an instructor to a plurality of world states, each world state comprising at least one sensor output value received from said at least one sensor and associated with said performance of said robotic actuator;
calculate, using said plurality of scores, a reward neural network dataset having a second plurality of neural network parameters;
compute, through machine learning, a reward function from said reward neural network dataset;
receive in each of a plurality of policy training iterations a reward value computed by applying said reward function to another world state, while said robotic actuator performs said target task according to said neural network dataset, wherein said another world state comprising at least one sensor output value received from said at least one sensor;

gather in a plurality of safety training iterations a plurality of safety scores given by a safety instructor to a plurality of safety states, each safety state comprising at least one other sensor output value, while said robotic actuator performs said target task according to said neural network dataset; and calculate using said plurality of safety scores a safety neural network dataset having a third plurality of neural network parameters and used for computing a safety function;

update at least some of said plurality of neural network parameters based on said received reward value of each of said plurality of policy training iteration; and output said updated neural network dataset; wherein said at least some of said plurality of neural network parameters are updated by:

receiving in each of said plurality of policy training iterations a safety value computed by applying said safety function to said another world state, while said robotic actuator performs said target task according to said neural network dataset; and identifying at least one safe controller action subject to said safety value being less than an identified threshold safety value.

15. The system of claim 14, wherein said at least one sensor is selected from a group consisting of: a light sensor, a camera, a sound sensor, a microphone, a temperature sensor, a contact sensor, a proximity sensor, a distance sensor, a global positioning sensor, a tilt sensor, a pressure sensor, an acceleration sensor, a gyroscope, an electrical current sensor, and an electrical voltage sensor.

16. The system of claim 14, wherein said at least one controller controls movement of a vehicle.

17. A method for a computerized mechanical device, comprising:

accessing a neural network data set generated by:

receiving data documenting a plurality of actions demonstrated by a demonstrating actuator performing a target task in a plurality of initial iterations;

calculating using said data a neural network dataset having a plurality of neural network parameters and used for mimicking said demonstrated plurality of actions in performing said target task;

gathering, in a plurality of reward training iterations of a robotic actuator performing said target task according to said neural network dataset, a plurality of scores given by an instructor to a plurality of world states, each world state comprising at least one sensor output value associated with said performance of said robotic actuator;

calculating, using said plurality of scores, a reward neural network dataset having a second plurality of neural network parameters;

computing, through machine learning, a reward function from said reward neural network dataset;

receiving in each of a plurality of policy training iterations a reward value computed by applying said reward function to another world state while said robotic actuator performs said target task according to said neural network dataset, wherein said another world state comprising at least one sensor output value;

gathering in a plurality of safety training iterations a plurality of safety scores given by a safety instructor to a plurality of safety states, each safety state comprising at least one other sensor output value, while said robotic actuator performs said target task according to said neural network dataset; and calculating using said plurality of safety scores a safety neural network dataset having a third plurality of neural network parameters and used for computing a safety function;

updating at least some of said plurality of neural network parameters based on said received reward value of each of said plurality of policy training iteration; and outputting said updated neural network dataset;

receiving a plurality of sensor output values; and instructing at least one controller to perform one or more of an identified set of controller actions according to said updated neural network dataset in response to receiving said plurality of sensor output values;

wherein updating said at least some of said plurality of neural network parameters further comprises:

receiving in each of said plurality of policy training iterations a safety value computed by applying said safety function to said another world state, while said robotic actuator performs said target task according to said neural network dataset; and identifying at least one safe controller action subject to said safety value being less than an identified threshold safety value.

* * * * *